March 3, 1970     R. M. LOCKWOOD ET AL     3,498,063
MULTIPLE-COMBUSTOR PULSE JET ENGINE STRUCTURE
Filed March 27, 1968     4 Sheets-Sheet 1
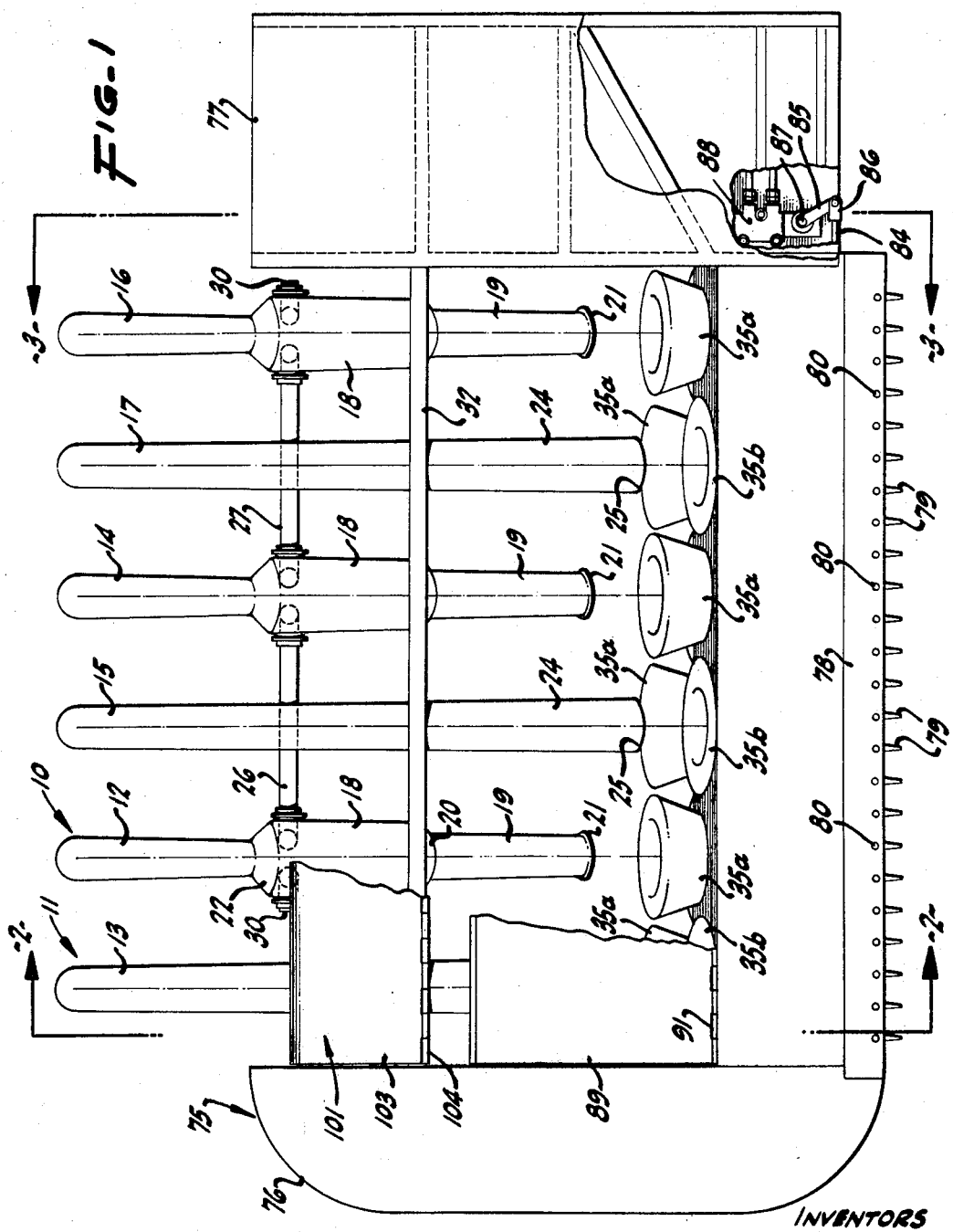
INVENTORS
RAYMOND M. LOCKWOOD
EDWARD L. BENNETT
DAVID A. GRABER
ELBERT R. SARGENT
BY Stanley Bialos
ATTORNEY

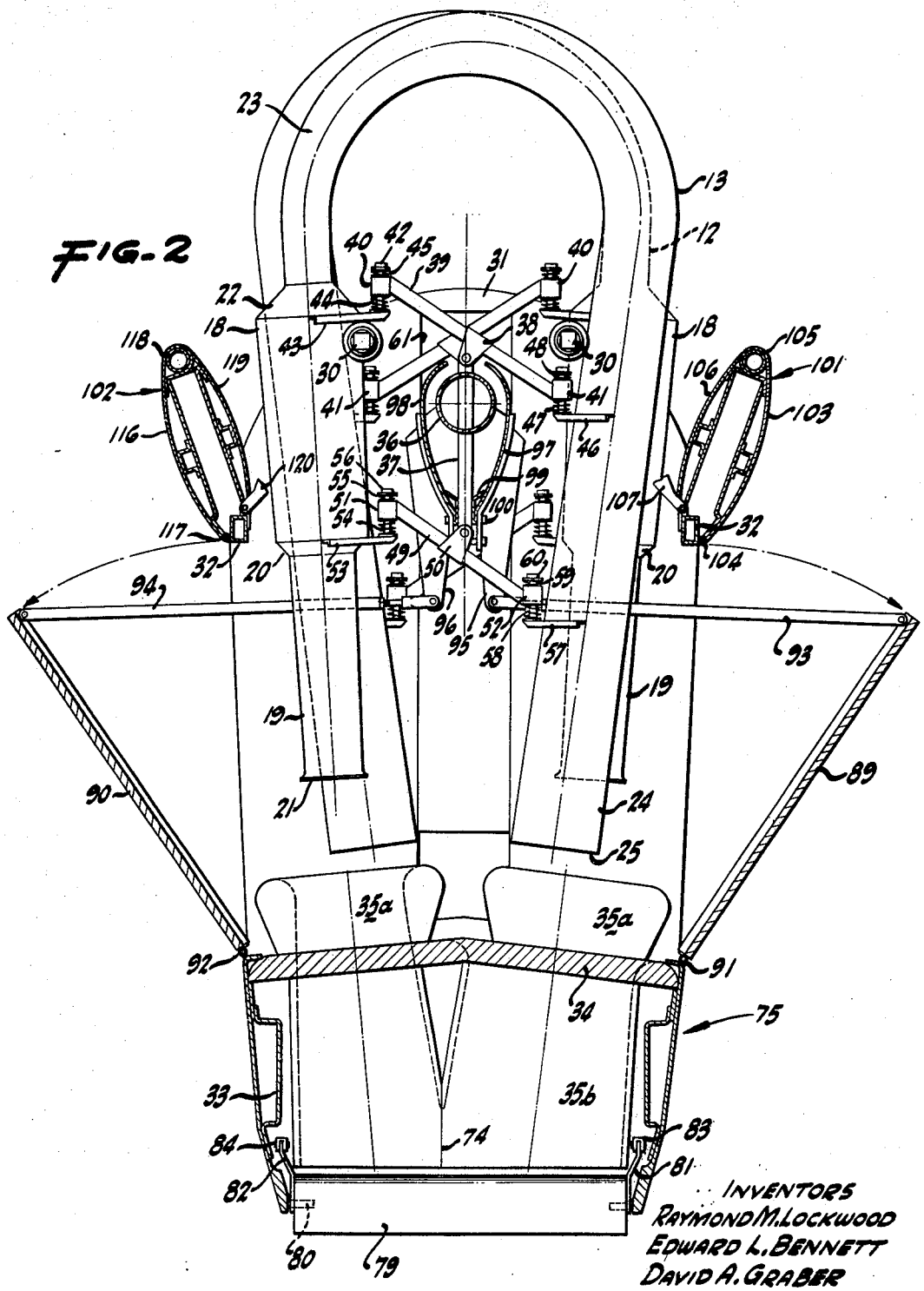

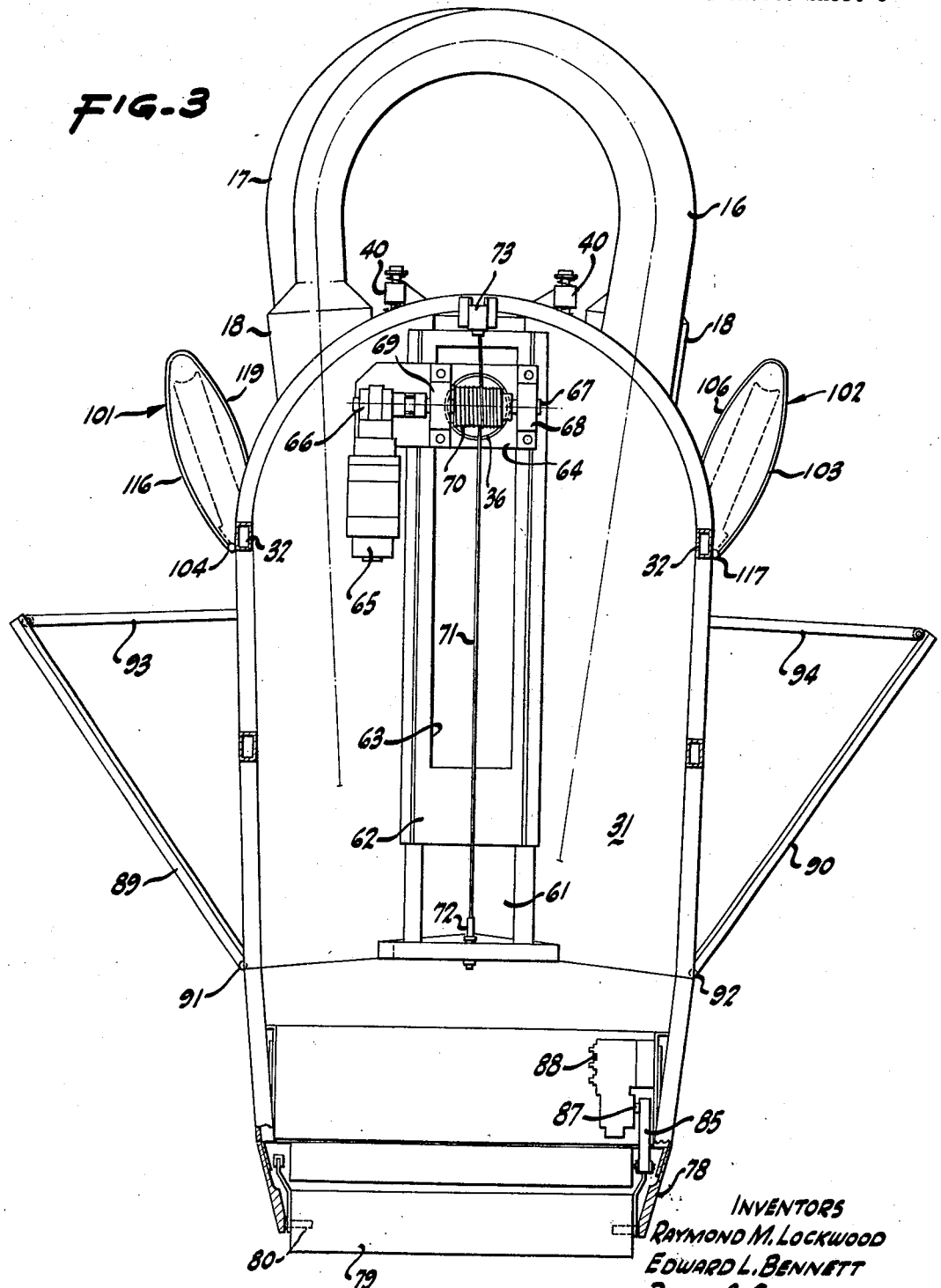

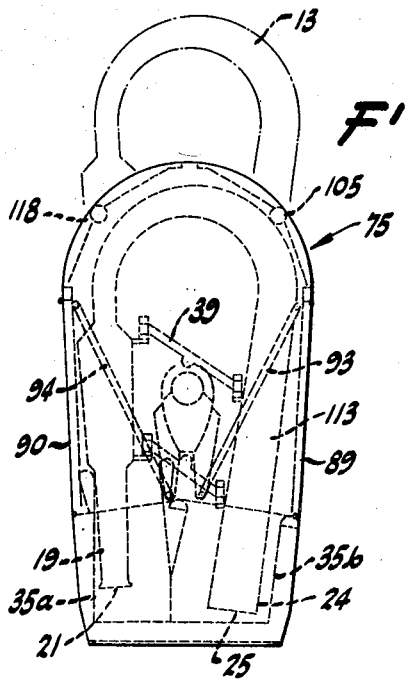
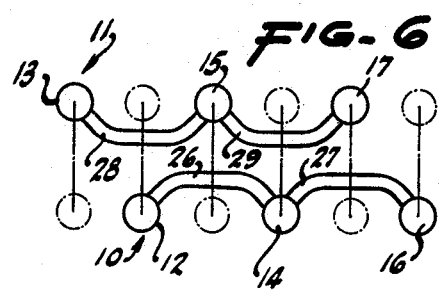
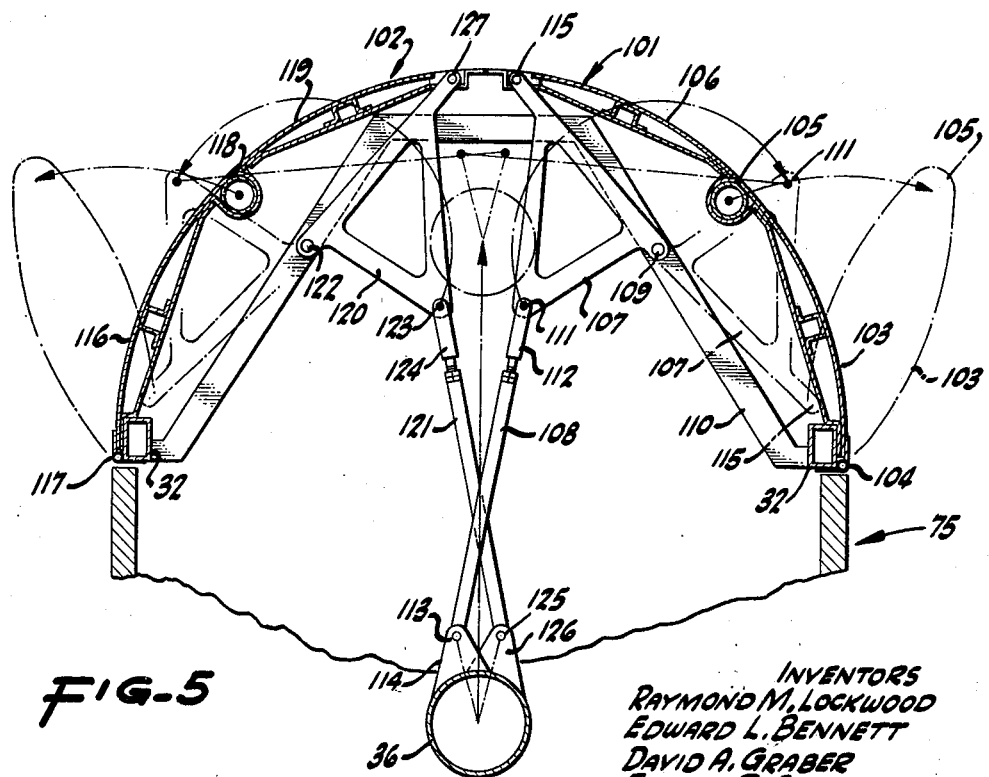

United States Patent Office 3,498,063
Patented Mar. 3, 1970

3,498,063
MULTIPLE-COMBUSTOR PULSE JET
ENGINE STRUCTURE
Raymond M. Lockwood and Edward L. Bennett, Los Altos, David A. Graber, Menlo Park, and Elbert R. Sargent, Sherman Oaks, Calif., assignors to Fairchild Hiller Corporation, Hagerstown, Md., a corporation of Delaware
Filed Mar. 27, 1968, Ser. No. 716,522
Int. Cl. F02k 9/06, 7/02; B64b 1/24
U.S. Cl. 60—225                        14 Claims

ABSTRACT OF THE DISCLOSURE

An engine structure comprising a plurality of pulse-jet combustors (individual engines) arranged in banks with those combustors in any one bank being interconnected in a manner enforcing thereon a predetermined operational-phase relationship relative to each other. As an example, six generally U-shaped pulse-jet combustors each having a combustion chamber therealong are arranged in banks of three with those combustors in any one bank being interconnected at their combustion chambers by flow tubes effective to enforce on the combustors of such one bank a coincident operational-phase relationship.

---

This invention relates to a pulse-jet engine structure and, more particularly, to an engine structure comprising a plurality of individual pulse-jet engines or combustors arranged in one or more banks thereof with those combustors in any one bank being interconnected in a manner to enforce thereon a predetermined operational-phase relationship. The engine structure is useful, for example, in vertical take-off and landing (VTOL) aircraft to provide lift therefor especially during take-offs and landings.

As explained in Lockwood Patent No. 3,206,926, a pulse-jet engine, or combustor, is a relatively simple structure essentially comprising an elongated-hollow tube open at its ends and which may be turned upon itself into a generally U-shaped configuration with the open ends thereof facing in the same direction. Intermediate the ends of the engine tube, fluid fuel is introduced thereinto through a nozzle structure located at a section of the tube generally referred to as the combustion chamber. A sparking device is also located at such combustion chamber, and in operation of the engine or combustor, both fuel and air, the latter in sufficient volume to create a combustible mixture with the fuel, enter the combustion chamber and the sparking device is energized to ignite the mixture. Upon ignition thereof, the consequent expansion of the gases within the combustion chamber results in a gaseous discharge through the open ends of the combustor producing thrust forces tending to propel it in a direction opposite to the direction of flow of the gaseous discharge.

Ignition of the fuel within the combustion chamber is accompanied by rapidly increasing gaseous pressure therein which rises to a value tending to interrupt fuel expression from the nozzle. As the combustion gases expand outwardly from the combustion chamber for discharge through the open ends of the engine, the pressure within the combustion chamber progressively decreases until a value is reached at which a charge of fuel sprays from the nozzle and a reverse flow of the gases toward the combustion chamber is initiated. Such reversal of flow direction results in ambient air being drawn into the combustion chamber for admixture with the fuel charge therein. The combustible mixture of fuel and air is then ignited and the cycle of operation is repeated. The sparking device can be re-energized once the engine begins to operate because ignition of the combustible fuel and air mixture is caused by the temperatures attained in the combustion chamber.

The discharge of fuel from the nozzle structure and into the combustion chamber is intermittent as a consequence of the cyclic changes in pressure therein from a low value corresponding to the final phases of gaseous expansion during the combustion cycle to a high value corresponding to the initial phases of gaseous expansion following ignition of the combustible mixture; and the pressure at which fuel is supplied to the nozzle is selected to have a value so related to such gaseous pressures that discharge of fuel into the combustion chamber is terminated by the higher pressure therein and is permitted at the lower pressures which reduce to values less than atmospheric. Evidently then, the engine operates intermittently at a cyclic repetition rate that can vary over wide ranges and is essentially proportional to the overall length of the engine. By way of example, a typical cyclic frequency may come within the range of from about 30 cycles per second for relatively long engines to about 200 cycles per second, or more, for shorter engines—i.e., 2½ to 3 feet in length.

In certain instances it is desirable to group or combine a plurality of individual combustors into a single engine structure in an arrangement such that the thrusts respectively developed by the combustors are aggregative. In any such grouping, however, the combustors tend to function in a random and variable operational-phase relationship in which the noise or sound level is objectionable, in which the combustors interfere with each other, and in which the combustor operation is generally unreliable. Accordingly, the advantages which might otherwise be attributable to such grouping of combustors into a single engine structure are at least sharply minimized and often lost. In view thereof, one of the general objects of the present invention is to provide an improved engine structure comprising a plurality of individual pulse-jet combustors, and in which engine structure means are included for positively enforcing a predetermined operational phase-relationship on such combustors so as to reduce or obviate the aforementioned disadvantages, thereby diminishing the noise level of the combustors, lessening disturbance of gaseous flow at the inlet of each combustor, creating a supercharging effect at each engine, and improving the general operating characteristics of such pulse jet engine structure.

In accordance with the present invention, a plurality of individual combustors are arranged in banks or groups thereof, and the combustors in any one group are coupled to each other by flow conduits interconnecting the combustors at the combustion chambers thereof. Such coupling of the combustors in any one bank thereof causes the combustors to operate in a predetermined phase relationship which, in the specific embodiment considered herein, is a relationship of phase coincidence. Additionally, the banks of combustors are arranged with respect to each other so that the engines in alternate banks operate in phase opposition.

In addition to the general object of the invention as stated hereinbefore, there are a number of further objects and advantages especially of a more particular character, as will become apparent as the specification develops.

An embodiment of the invention is illustrated in the accompanying drawings in which:

FIGURE 1 is a side view in elevation of an engine structure embodying the invention with portions of the structure being broken away to show interior features;

FIGURE 2 is an enlarged vertical sectional view taken along the plane 2—2 of FIGURE 1;

FIGURE 3 is an enlarged vertical sectional view taken along the plane 3—3 of FIGURE 1;

FIGURE 4 is an end view in elevation illustrating the engine structure in the closed or inoperative condition thereof and depicting one of the combustors by broken lines in its extended operative position;

FIGURE 5 is a further enlarged vertical sectional view showing the manner in which the inlet flares or closure doors open to permit the combustors to be hoisted into their operative position; and FIGURE 6 is a diagrammatic view illustrating the interconnection of the individual combustors in the two banks thereof comprised in the engine structure being considered.

An engine structure embodying the invention is shown generally in FIGURE 1 and it comprises a plurality of individual combustors arranged in two banks thereof. The disposition and arrangement of the combustors is shown most graphically in FIGURE 6 and, for purposes of positive identification, the two banks are respectively denoted with the numerals 10 and 11, the individual combustors in the bank 10 are denoted with the numerals 12, 14 and 16, and the combustors in the bank 11 are denoted with the numerals 13, 15 and 17. Evidently then, there are a total of six individual combustors in the particular engine structure being considered, and such combustors are arranged in banks of three each.

All of the combustors are substantially identical and, as shown in FIGURE 2, each combustor is a hollow tube open at its ends and turned upon itself into a generally U-shaped configuration such that the open ends of the tube face in the same general direction. Intermediate its ends and along one leg thereof, each combustor is provided with a combustion chamber 18 and, for purposes of simplifying the description, the combustion chamber of each combustor will be denoted with the numeral 18. The combustion chamber 18 of each combustor is connected at one of its ends to an inlet-nozzle section 19 through a transition section 20 of frusto-conical configuration, and such nozzle section 19 terminates in an inlet opening 21. The combustion chamber 18 at its other end is connected through a truncated conical-transition section 22 and a generally arcuate-coupling section 23 (the base of the U) to a tail pipe 24 terminating in an exhaust opening 25. Further details of the combustors especially as concerns the sparking device, fuel nozzle, and various connections therefor are not shown and will not be described since they form no part of the present invention; but further details concerning the combustors are disclosed in assignee's copending patent applications Ser. No. 649,876, filed June 29, 1967, and Ser. No. 649,879, filed June 29, 1967, now Patent No. 3,456,441, dated July 22, 1969, and insofar as any of such details are either necessary or desirable as respects the subject application, they are incorporated herein by this reference.

It is clear from the drawings that the successive alternate combustors are oriented in opposite directions wherefore the combustors 12, 14 and 16 comprising the bank 10 thereof have their combustion chambers 18 and inlet-nozzle sections 19 all disposed in the same direction, or on the right-hand side, as viewed in FIGURE 2; and the combustors 13, 15 and 17 comprising the bank 11 thereof have their combustion chambers and inlet-nozzle sections 19 oriented in the opposite direction, or on the lefthand side, as viewed in FIGURE 2. The combustors of the bank 11 are alternately disposed with respect to the combustors of the bank 10, as is most evident in FIGURES 1 and 6 and, as indicated hereinbefore, the combustors in any one bank are coupled to each other so as to positively enforce a predetermined operational-phase relationship thereon. In this respect, the combustion chambers 18 of the combustors 12, 14 and 16 are respectively interconnected by flow conduits 26 and 27 and, similarly, the combustion chambers 18 of the combustors 13, 15 and 17 are respectively interconnected by flow conduits 28 and 29.

As a manufacturing convenience it is preferable to make all of the combustors identical and, accordingly, each combustor has two openings into the combustion chamber 18 thereof which are adapted to receive any one of the flow conduits 26 through 29. In that each of the four outer combustors 12, 13, 16 and 17 has only one such flow conduit connected thereto, it is necessary to close the remaining opening and, as shown in FIGURES 1 and 2, such closure is accomplished by plug structure 30, the same numeral being used in each instance since such plug structures are all identical.

The engine structure includes a plurality of frame components which provide support means for the various combustors, the nacelle therefor, and the otherwise necessary and associated elements and mechanisms, and such frame components particularly include a pair of substantially parallel and upwardly-extending end walls or bulkheads one of which is shown in FIGURES 2 and 3 and is denoted with the numeral 31. The end walls are interconnected in spaced-apart parallelism by a variety of structural members including a plurality of horizontally-extending beams 32 which, in the form shown, are rectangular in cross section and hollow for weight reduction purposes. Additionally, a plurality of somewhat U-shaped channels 33 extend between the end walls adjacent the lower end thereof, and overlying the channels 33 is a lower wall 34 which provides a support means for a plurality of thrust augmentors 35, as will be described in detail hereinafter.

Also extending between the end walls at a location intermediate the two legs of each combustor is a centrally-disposed main support beam 36. The support beam 36 in the form shown is a hollow cylindrical tube, horizontally oriented, and equipped at spaced-apart locations therealong with a plurality of vertically-extending columns 37 which may project through the beam and be welded or otherwise rigidly secured thereto. One column 37 is provided for each combustor, wherefore six such columns are included in the particular engine structure being considered. Adjacent its upper end each column 37 is secured through a fastener or coupling 38 to a strut 39 that is angularly disposed and is equipped at the outer ends thereof with collars 40 and 41. The collar 41 slidably passes therethrough an upwardly-extending stud 42 which at its lower end is fixedly secured to a bearing plate 43 welded or otherwise affixed to the associated combustor which, in the illustration of FIGURE 2, is the combustor 13. The bearing plate 43 is attached to the combustor 13 at the combustion chamber 18 thereof, and a pair of helical springs 44 and 45 respectively disposed on opposite sides of the collar 40 are circumjacent the stud 42 and resiliently relate the strut 39 thereto. Evidently, the stud 42 at its upper end is equipped both with a washer providing a seat for the spring 45 and with a nut to retain the springs and strut in position relative to the stud. The strut 39 at its opposite end is similarly attached to the tail pipe 24 of the combustor by means of a bearing plate 46 and helical springs 47 and 48.

A generally similar strut 49 is provided adjacent the lower end of the column 37 and it is secured thereto through a fastener or coupling 50. The strut 49 is substantially parallel to the strut 39 and is provided at its opposite ends with collars 51 and 52. The collar 51 is resiliently secured to the combustor 13 through a bearing plate 53 affixed thereto adjacent the lower end of the combustion chamber 18, and through a pair of helical springs 54 and 55 and a stud 56. Correspondingly, the collar 52 is resiliently secured to the tail pipe 24 of the combustor through a bearing plate 57, helical springs 58 and 59 and a stud 60.

Evidently, the two struts 39 and 49 together with the combustion chamber 18 and tail pipe 24 approximate a parallelogram in configuration and fixedly relate the associated combustor to the column 37 and support beam 36 while affording limited resilient displacements for the combustor within the dimensions imposed by the various helical springs so as to accommodate vibratory and similar small-displacement disturbances of the combustor. Each of the combustors is resiliently secured to the support beam 36 in the same manner, and because the combustors in the opposite banks 10 and 11 thereof are reversely oriented, the struts 39 and 49 for the combustors 13, 15 and 17 incline in one direction (downwardly and toward the right as viewed in FIGURE 2) and those for the combustors 12, 14 and 16 angle at a generally opposite direction (downwardly and toward the left as viewed in FIGURE 2).

The support beam 36 and all of the combustors carried thereby are movable between an inner lower position for storage in which the combustors are inoperative and an outer upper position in which they are intended to be operative. Such two positions of the combustors are illustrated in FIGURE 4 which shows primarily the combustors in their retracted inner position completely covered by the engine nacelle but which depicts secondarily in broken lines above the nacelle the outer operative position of the combustors. Evidently then, the combustors must be free to move between the raised and lowered positions thereof, and since the combustors are attached to and carried by the support beam 36, such beam must also be free to move between corresponding upper and lower positions.

Although a variety of structural compositions may be employed to enable and provide such movement for the combustors and support beam, in the particular engine structure being considered, the beam 36 is guided for vertical displacements by the upwardly extending bulkheads or end walls 31 which comprise a part of the frame components. In this respect, each end wall is provided therein with a vertically-extending opening 61 through which extends the adjacent end portion of the support beam 36. Secured along the outer surface of each end wall in overlying relation with the opening 61 is a track 62 having a guide opening 63 extending therealong in alignment with the associated opening 61 but which may be somewhat narrower and also shorter than such opening 61. Mounted on the track 62 for vertical displacements therealong is an elevator 64 to which the adjacent end portion of the support beam 36 is secured and which elevator carries a reversible drive motor 65. The drive motor 65 is connected through a gear reducer 66 to a shaft 67 journalled for rotation at spaced-apart locations in bearings 68 and 69. Intermediate such bearings, the shaft 67 carries a drum 70 constrained upon the shaft so as to rotate therewith.

Wound about the drum 70 is a cable 71 having free end portions extending from the drum in opposite directions. Thus, one free end portion of the cable 71 extends downwardly, as viewed in FIGURE 3, and comes from the rear side of the drum, and at its lower end is fixedly secured by an anchor 72 to stationary frame components of the engine structure. The other free end portion of the cable extends upwardly from the drum and comes from the forward side thereof and at its upper end is secured by an anchor 73 to stationary frame components of the engine structure. A similar arrangement may be provided along the opposite end wall 31 of the engine structure, and in such event the support beam 36 is constrained against displacements along the longitudinal axis thereof by the two elevators 64 which are disposed along the outer surfaces of the respectively associated tracks 62. The guide members, including especially the guide opening 63, constrain the support beam 36 against significant transverse displacements.

In a vertical sense, the support beam 36 and combustors carried thereby are supported by the cables 71 each of which at its upper end is secured to frame components of the engine structure by the associated anchor 73. Accordingly, the support beam 36 is suspended from the cables 71 via the drum 70 and elevator 64, but is selectively movable upwardly and downwardly in accordance with the direction in which the reversible motor 65 is energized. Accordingly, and assuming that the shaft 67 and drum 70 are viewed by looking theretoward from right to left in FIGURE 3, if the motor 65 is energized in a direction such that the shaft 67 and drum 70 rotate in a clockwise direction, the support beam 36 will tend to rise along the cable 71. Reverse energization of the motor 65 to enforce a counterclockwise rotation upon the shaft 67 and drum 70 will cause the support beam 36 to move downwardly to retract the combustors into the inoperative positions thereof illustrated in FIGURE 4.

As indicated hereinbefore, downward movement of the combustors into their inoperative positions causes the inlet-nozzle section 19 and tail pipe 24 of each combustor to telescope into the thrust augmentors 35 respectively aligned therewith. The augmentors 35 are effective to increase markedly the magnitude of the thrust developed by each combustor; and in effecting such beneficial results, certain parameters are of significance and complete details concerning the same, and the thrust augmentors generally, are set forth in the aforementioned Lockwood Patent No. 3,206,926. Since such details in themselves are of no particular relevance to the present invention, they are not included herein.

It may be observed, however, that the thrust augmentors 35 differ from each other as between those associated with the inlet-nozzle sections 19 of the various combustors and those associated with the tail pipes 24 thereof. More particularly and considering FIGURES 1, 2 and 4, the thrust augmentors associated with each of the inlet-nozzle sections 19 are longer in vertical dimension than the augmentors associated with the tail pipes 24, and there is also a difference in diameter with the inlet augmentors being somewhat smaller than the exhaust augmentors. In view of these differences and to facilitate a ready understanding of the drawings, the inlet augmentors are each denoted with the numeral 35a and the exhaust augmentors with the numeral 35b. As concerns the lengths of the exhaust augmentors 35b, it will be noted that they terminate at their upper ends generally along the surface of the frame component 34 and that the two augmentors 35a and 35b associated with any one combustor 13 merge along their lower facing edges 74 to define a common exit opening thereat.

The engine structure includes a nacelle to enclose the various combustors when not in use, and the nacelle is generally denoted in the drawings with the numeral 75. As shown in FIGURE 1, the nacelle 75 may include a nose cowling 76 covering the front wall or bulkhead of the frame structure and components associated therewith, and it may also include a fairing 77 covering the rear wall or bulkhead 31 of the frame structure and various components carried thereby and otherwise associated therewith. At its bottom below the exit openings of the various thrust augmentors 35, the nacelle is open so as to accommodate a vane assembly 78 equipped with a plurality of spaced-apart vanes 79 each of which is supported on pins 80 for pivotal movements between a depending open position, shown in FIGURES 1, 2 and 3, and an upper closed position shown in FIGURE 4.

For the purpose of enforcing pivotal displacements uopn the vanes 79, each vane is provided along the opposite ends thereof with upwardly-extending levers or arms 81 and 82 fixedly related to the vanes and pivotally secured, respectively, to elongated longitudinally-extending channels 83 and 84 which have an inverted generally U-shaped configuration. At least one of the channels (the chanel 84 in the present structure) is connected with reversible motor means operative to enforce reciprocable longitudinal displacements thereon to move the vanes selectively between their open and closed positions. As shown in FIGURE 1, such motor means may include an arm 85 pivotally secured to the channel 84 as through a bifurcated coupling 86; and the arm 85 is angularly displaceable about the axis of a pivot pin 87 by a motor 88, which may be fluid actuated, connected with such pin 87 so as to angularly displace the same and thereby swing the lever 85 about the axis of such pin.

The nacelle is further provided with side walls or doors 89 and 90 movable between the inner closed positions thereof, shown in FIGURE 4, and the outer open positions illustrated in FIGURES 1, 2 and 3. In order to afford such movement, the doors 89 and 90 are hingedly supported adjacent the lower edges thereof by hinge components 91 and 92, respectively. Adjacent their upper ends, the door 89 is pivotally secured to one or more elongated rods 93, and in a similar manner, the door 90 has one or more rods 94 pivotally secured to its upper end. The rods 93 and 94 adjacent their inner ends are pivotally secured, respectively, to stationary connectors 95 and 96 fixedly mounted upon a pair of shell or guide members 97 and 98 extending along the support beam 36 and substantially enclosing the same. The shell members 97 and 98 are somewhat arcuate and curve downwardly and inwardly into adjacency with the upwardly extending columns 37 along their lower end portions and are attached thereto by fastener structure 99. The connectors 95 and 96 may be riveted or otherwise secured to the shell members 97 and 98 and fastener structure 99, as shown at 100.

It will be apparent that the connectors 95 and 96 necessarily move upwardly and downwardly with the support beam 36 and columns 37 attached thereto. As a consequence of such movement, the rods 93 and 94 adjacent their inner ends are moved upwardly and downwardly since such inner ends thereof are respectively secured to the connectors 95 and 96. Accordingly, when the support beam 36 and combustors carried thereby are in their upper-operative position, as shown in FIGURES 2 and 3, the rods 93 and 94 are displaced outwardly so as to open the covers 89 and 90. Whenever the support beam 36 is displaced downwardly to retract the combustors into their inoperative positions, the downward motion thus enforced upon the inner end portions of the rods 93 and 94 causes the doors 89 and 90 to pivot inwardly at their upper ends and into the closed positions thereof shown in FIGURE 4.

The nacelle 75 is also provided along the upper surfaces thereof with a pair of inlet flares or closure doors 101 and 102 selectively movable between the closed position thereof shown in FIGURE 5 and the open position illustrated in FIGURES 2 and 3. The closure doors 101 and 102 are substantially identical and each is formed in two parts hingedly interconnected along the longitudinal-center line thereof. Considering in particular the closure door 101, such two sections thereof include a lower section 103 hingedly connected at its lower edge to the adjacent beam 32 by a longitudinally-extending hinge structure 104. Adjacent its upper edge, the cover section 103 is pivotally connected by tubular-hinge structure 105 to an upper section 106. Comparing FIGURES 2 and 5, it will be evident that the sections 103 and 106 of the closure door 101 form a substantially-continuous arcuate closure projecting upwardly from the beam 32 to the top of the nacelle 75 when the closure door is in its closed position, and when moved into its open position, the lower section 103 articulates outwardly about the axis of the hinge 104, and the upper section 106 folds downwardly about the axis of the hinge structure 105 and into adjacency with the lower section 103.

Referring again to the closure door 101 in particular, movement thereof between its open and closed positions is effected by linkage mechanism that includes a bell crank 107 and a push rod 108. The bell crank is pivotally supported at the mergence of the main legs thereof by a pin 109 carried by a stationary frame component 110 having a somewhat inverted V-shaped configuration and at opposite ends thereof being fixedly secured to certain of the beams 32. One main leg of the bell crank 107 is pivotally connected by a pin 111 to an adjustable coupling such as a clevis 112 forming the upper-end portion of the push rod 108, which push rod at its lower end is pivotally connected by a pin 113 to an ear 114 fixedly secured to the support beam 36 and extending upwardly therefrom. The other main leg of the bell crank 107 is pivotally connected by a pin 115 to the upper closure door section 106 along the upper-longitudinal edge thereof.

In considering the paths of movement traversed by the articulating sections 103 and 106 of the closure door 101 in moving from the closed position shown in FIGURE 5 into the open position illustrated in FIGURES 2 and 3, it may be noted first that the coupling 112 must permit the leg connected thereto of the bell crank 107 to swing between the full line and broken line positions shown in FIGURE 5, and that the connection between the bell crank and closure section 106 defined at the pin 115 must permit the section 106 to move between the two positions thereof shown in this same figure. As explained previously, the support beam 36 will be displaced upwardly from the lower full-line position thereof shown in FIGURE 5 into the broken-line position indicated in this same figure as the closure door 101 is opened, and such movement of the support beam will cause the push rod 108 to be displaced upwardly therewith. As a consequence thereof, the bell crank 107 rotates in a clockwise direction, as viewed in FIGURE 5, about the axis of the pin 109 with the result that the sections 103 and 106 will be swung outwardly in unison about the axis of the hinge 104.

As such upward movement of support beam 36 continues, the push rod 108 tends progressively to flatten toward a somewhat horizontal position thereby causing the closure door 101 to continue to move outwardly until the dimensional relationships are such that the upper section 106 folds downwardly and inwardly in a counter-clockwise direction, as viewed in FIGURE 5, about the axis of the hinge structure 105. Such folding action of section 106 continues as the support beam 36 progresses upwardly until the support beam finally reaches the limit of its upward movement at which time the hinge structure 105 has been moved outwardly and into the broken-line position thereof shown in FIGURE 5, the pin 111 has moved outwardly into the extreme poistion thereof indicated in FIGURE 5, and the pin 115 is in the lower position thereof indicated in this same figure, whereupon the bell crank 107 is then in the broken-line position thereof also shown in FIGURE 5. All of the paths of movement traversed by the various pivot pins are illustrated in FIGURE 5 as are the final open positions of the closure door sections 103 and 106 and the corresponding position of the bell crank 107. Evidently, these paths of movement are traversed into the opposite directions when the support beam 36 is lowered to retract the combustors into their inoperative position.

As explained hereinbefore, the closure door 102 is substantially identical with the closure door 101 and, accordingly, it has lower section 116 supported for movement about a hinge 117, a hinge structure 118 interconnecting the lower section 116 with an upper closure-door section 119, a bell crank 120 and a push rod 121, a pivot pin 122 connecting the bell crank 120 with the frame member 110, a pivot pin 123 and adjustable coupling such as a clevis 124 connecting the bell crank with the push rod, a pivot pin 125 and ear 126 connecting the lower end of the push rod 121 with the support beam 36, and a pivot pin 127 connecting the bell crank 120 with the upper-longitudinal edge of the closure-door section 119. The correspondence of various components as between the closure doors 101 and 102 is evident from the drawings and the various paths of movement of the axes of the pivot pins associated with the closure door 102 also are illustrated in FIGURE 5.

From the foregoing description it will be apparent that the engine structure forms a compact, streamlined package whenever the various combustors 12 through 17 are retracted for stowage for at such time they are substantially enclosed within the dimensional confines of the nacelle 75 which then has the side doors 89 and 90 thereof closed, the inlet closure doors 101 and 102 closed, and most appropriately the various vanes 79 closed. To hoist the combustors for use, the motors 65 are energized so as to impart rotational movement to the shafts 67 and drums 70 carried thereby, whereupon the elevators 64 climb upwardly along the respectively associated cables 71 to raise the support beam 36 and thereby hoist the combustors. Such upward movement of the support beam causes the side doors 89 and 90 to swing outwardly into the open positions thereof shown in FIGURES 2 and 3, and also causes the inlet closure doors 101 and 102 to fold into their open positions which define an air inlet through which ambient air is supplied to the combustors. The vane assembly 78 may be opened automatically as a part of the hoisting operation described (through the interconnection of control circuitry, not shown) or it may be manipulated independently through separate controls. As explained hereinbefore, energization of the motors 65 in the reverse direction will retract the combustors and close the various doors.

Fuel is necessarily supplied to the combustion chambers 18 of the various combustors and electrical connections must be made with the sparking device thereof. Referring to FIGURE 2, the relatively large space defined between the shell members 97 and 98 is adequate to accommodate fuel lines and electrical conductors and provides an advantageous location for such lines since the shell members 97 and 98 move upwardly and downwardly with the combustors. Connection with such lines are conveniently made within the compartment defined by the fairing 77 along the end wall 31, and since such compartment is relatively large, the various controls required for or otherwise used in association with the engine structure may be housed at this location.

As explained heretofore, the use of three or more pulse-jet combustors in relatively close proximity causes the combustors, unless they are coupled to each other in accordance with the present invention, to operate in a random-phase relationship which is unsteady and results in the combustors tending to continuously hunt or change phase. Such hunting action and random-phase relationship increases the natural engine noise, reduces engine efficiency, and creates instability in which at least certain of the combustors may tend to flame-out or cease operating. Contrarywise, the phase stability and interlock positively enforced on the combustors by the interconnection thereof as described substantially eliminate such difficulties and, therefore, reduce noise, improve the general stability and efficiency of the combustors, effectively eliminate flame-out, and also make it easier to start each of the combustors.

The interconnection of the combustors in any one bank thereof can be effected at the combustion chambers 18, as shown in the drawings and as described herein, but such interconnection also can be made along the inlet openings 21 of the combustors as by mounting connector tubes thereat with the open ends thereof disposed in facing relation with the inlet openings 21 of the associated combustors. Such an arrangement has the disadvantage of having somewhat less thrust transmitted between combustors than in the arrangement illustrated, but can be structurally more simple because accommodation does not have to be provided for expansions and contractions due to heat as between the hot combustion chambers and flow conduits connected therewith, nor must accommodation be made for relative vibration therebetween the combustors and flow conduits as in the arrangement illustrated wherein slip joints are included for such accommodations. In either event, the synchronization enforced on the combustors as a consequence of the interconnections thereof is effected by the pressure waves which are transmitted from one combustor to the other by such interconnections.

Arranging the combustors in two banks thereof, as shown especially in FIGURE 6, in which the combustors in any one bank operate in phase coincidence and in which the combustors in such two banks are alternately positioned and disposed in close proximity, tends to cause the engines in such two banks to function in phase opposition because of the pressure-wave transmissions between the combustors of one bank and those of the other. Therefore, without positively interconnecting the combustors across the two banks thereof, a condition of out-of-phase synchronism is nevertheless attained.

In order to provide an exemplary indication of the relative dimensional interrelationships in a particular embodiment of the invention, the following may be considered:

Each combustor in the engine structure has the generally U-shaped configuration illustrated in the drawings with the base of the U having a curvature of about 191°. The length of each combustor from the exhaust opening 25 thereof to the transition section 22 is about 40.6 inches, and the length of the inlet nozzle section 19 from the opening 21 thereof to the transition section 20 is about 6 inches. The length of the combustion chamber 18 exclusive of the transition sections 20 and 22 thereof is about 6 inches; and the diameter of the combustion chamber adjacent the transition section 20 is about 4 inches and the diameter of the inlet nozzle section 19 adjacent the transition section 20 is about 1.6 inches. Correspondingly, the diameter of the combustion chamber adjacent the transition section 22 is about 4.3 inches, and the diameter of the tube adjacent the smaller end of the transition section 22 is about 1.1 inches. The smallest diameter of the inlet opening 21 is about 1.5 inches, and the diameter of the exhaust opening 25 is about 1.8 inches.

The flow conduits 26 through 29 in such engine structure each has a diameter of about 1.5 inches with a length of about 14 inches; and the adjacent combustors are oriented in a center-to-center spacing of about 10 inches. Each of the inlet thrust augmentors 35 has an overall length of about 16.4 inches with an inner diameter adjacent its upper end of approximately 6.3 inches and an angle of taper enlarging toward the lower end thereof of about 4°. Each of the exhaust augmentors 35b has a length of about 11.3 inches, an inner diameter adjacent the upper end thereof of about 9.6 inches, and an angle of taper enlarging toward the lower end thereof of about 4°.

Operation of such particular engine structure established that a strong coupling occurred between adjacent combustors, and the interconnected combustors in each bank operated essentially in phase coincidence. It was found that the rate of fuel delivery to any one of the interconnected combustors could be reduced until combustion ceased at such combustor, and combustion therein could again be initiated smoothly and without difficulty by simply increasing the rate of fuel delivery to such combustor. Connector conduits were used in such engine structure having lengths of 27, 57 and 70 inches instead of the 14-inch flow conduits and the operation of the engine structure was essentially the same except that the 14-inch flow conduits provided the strongest coupling between combustors. Connector tubes having a length of about 85 inches were substituted, and tubes of this length caused the interconnected combustors to operate in phase opposition.

While in the foregoing specification an embodiment of the invention has been set forth in considerable detail for purposes of making a complete disclosure thereof, it

What is claimed is:

1. In an engine structure, a plurality of frame components, a pulse-jet combustor comprising an elongated-hollow tube of generally U-shaped configuration open at its ends and providing an inlet-nozzle section adjacent one end thereof and a tail pipe adjacent its other end, a pair of hollow thrust augmentors carried by said frame components in respective alignment with said inlet-nozzle section and tail pipe, support beam structure secured to said combustor and being carried by said frame components for movement toward and away from said thrust augmentors to displace said combustor between a retracted inoperative position in which its inlet-nozzle section and tail pipe telescope into the thrust augmentors respectively aligned therewith and an extended operative position in which said combustor is moved away from said thrust augmentors to space the same from the respectively associated open ends of said combustor, and mechanism connected with said support beam structure for moving said support beam and the combustor carried thereby between such operative and inoperative positions.

2. The engine structure of claim 1 and further including an engine nacelle for said combustor and thrust augmentor and substantially enclosing the same in the retracted inoperative position of said combustor.

3. The engine structure of claim 2 in which said nacelle is equipped with closure doors selectively movable between a closed position when said combustor is retracted and an open position when said combustor is extended, and means for opening and closing said closure doors.

4. The engine structure of claim 3 in which said nacelle is equipped with an exit vane assembly disposed below said thrust augmentors and being provided with a plurality of vanes movable between open and closed positions, and mechanism for selectively moving said vanes between such positions thereof.

5. The engine structure of claim 4 in which said nacelle is further provided with side-wall door structures selectively movable between open and closed positions respectively corresponding to the extended operative and retracted inoperative positions of such combustor.

6. The engine structure of claim 1 in which a plurality of said pulse-jet combustors and a plurality of pairs of said thrust augmentors respectively aligned therewith are provided, each of said pulse-jet combustors being operative to produce cyclically repetitive thrust-producing gaseous-flow communication between such bank-defining conduit structure interconnecting at least certain of said combustors to form a bank thereof and to establish a gaseous-flow communication between such bank-defining combustors effective to enforce thereon a predetermined operational phase relationship.

7. The engine structure of claim 6 in which the aforesaid plurality of pulse-jet combustors totals at least four thereof arranged in banks each of which comprises two combustors, and in which the aforesaid flow-conduit structure includes two conduits respectively associated with said banks and interconnecting the combustors thereof to establish such flow communication therebetween.

8. The engine structure of claim 7 in which said combustors are disposed with respect to each other so that the thrust-producing gaseous discharges therefrom are oriented in the same general direction, and in which the combustors in each bank are spaced apart and have their inlet-nozzle sections and tail pipes disposed in respective alignment, the combustors in such banks being oppositely oriented with respect to each other and alternately arranged so that the combustors of one bank are interposed between the combustors of the other bank.

9. The engine structure of claim 8 in which the combustors in any one bank thereof operate in phase coincidence.

10. The engine structure of claim 9 in which the combustors as between such banks thereof operate in phase opposition.

11. The engine structure of claim 10 in which said flow conduits are respectively connected with the combustion chambers of the associated combustors.

12. The engine structure of claim 11 and further including an engine nacelle for said combustors and thrust augmentors and substantially enclosing the same in the retracted inoperative position of said combustors, said engine nacelle being equipped with closure doors selectively movable between a closed position when said combustors are retracted and an open position when said combustors are extended, and linkage means connected with said closure doors and support beam structure for automatically opening and closing said closure doors in accordance with movements of said support beam structure.

13. The engine structure of claim 12 in which said nacelle is equipped with an exit vane assembly disposed below said thrust augmentors and provided with a plurality of vanes movable between open and closed positions, and mechanism for selectively moving said vanes between such positions thereof.

14. The engine structure of claim 13 in which said nacelle is further provided with side-wall door structures selectively movable between open and closed positions respectively corresponding to the extended operative and retracted inoperative positions of said combustors, and additional linkage mechanism connected with said door structures and support beam structure for automatically opening and closing said side-wall door structures in accordance with movements of said support beam structure.

References Cited

UNITED STATES PATENTS 3,134,561   5/1964   Clejan ............ 244—54
3,417,944   12/1968  Ruffles ........... 244—54

MARK M. NEWMAN, Primary Examiner

D. HART, Assistant Examiner

U.S. Cl. X.R.

60—39.31, 249; 244—54

PO-1050
(5/69)

UNITED STATES PATENT OFFICE
CERTIFICATE OF CORRECTION

Patent No. 3,498,063          Dated March 3, 1970

Inventor(s) Raymond M. Lockwood et al.

It is certified that error appears in the above-identified patent and that said Letters Patent are hereby corrected as shown below:

Column 11, line 50, "flow communication between such bank defining" should read --discharges therefrom, and further including flow--.

SIGNED AND
SEALED

JUL 14 1970

(SEAL)
Attest:

Edward M. Fletcher, Jr.
Attesting Officer

WILLIAM E. SCHUYLER, JR.
Commissioner of Patents